United States Patent
Döricht

[11] Patent Number: 5,915,504
[45] Date of Patent: Jun. 29, 1999

[54] BRAKE SYSTEM FOR A MOTOR VEHICLE

[75] Inventor: Michael Döricht, Lappersdorf, Germany

[73] Assignee: Siemens Aktiengesellschaft, Munich, Germany

[21] Appl. No.: 08/899,748

[22] Filed: Jul. 24, 1997

[30] Foreign Application Priority Data

Jul. 24, 1996 [DE] Germany ............ 196 29 936

[51] Int. Cl.⁶ ............ F16D 55/16; F16D 55/08; F16D 65/34; H02K 5/16
[52] U.S. Cl. .......... 188/72.1; 188/71.8; 188/72.3; 188/158; 188/72.8; 188/162; 188/72.4
[58] Field of Search ............ 188/72.1, 72.7, 188/71.8, 71.9, 156, 158, 159, 72.4, 196 P, 196 D, 196 R, 162, 72.8, 72.3, 216; 303/115.2, 162, 20, 113.4, 155, 3

[56] References Cited

U.S. PATENT DOCUMENTS

| 4,478,004 | 10/1984 | Andrei-Alexandru et al. |
| 4,602,702 | 7/1986 | Ohta et al. ............... 188/72.1 |
| 4,623,044 | 11/1986 | Ohta et al. ............... 188/72.1 |
| 4,658,939 | 4/1987 | Kircher et al. ............ 188/156 |
| 4,784,244 | 11/1988 | Carre et al. ............... 188/156 |
| 4,793,447 | 12/1988 | Taig et al. ................. 188/72.1 |
| 4,795,002 | 1/1989 | Burgei et al. ............. 188/156 |
| 4,809,824 | 3/1989 | Fargier et al. ............ 188/72.1 |
| 4,836,338 | 6/1989 | Taig ......................... 188/72.1 |
| 4,850,457 | 7/1989 | Taig ......................... 188/72.1 |
| 4,854,424 | 8/1989 | Yamatoh et al. .......... 188/72.1 |
| 4,860,859 | 8/1989 | Yamatoh et al. .......... 188/156 X |
| 5,107,967 | 4/1992 | Fujita et al. ............... 188/72.1 |
| 5,161,650 | 11/1992 | Taig ......................... 188/71.9 |
| 5,219,048 | 6/1993 | Shaw et al. ............... 188/72.1 |
| 5,219,049 | 6/1993 | Unterborn ................. 188/156 |
| 5,348,123 | 9/1994 | Takahashi et al. ........ 188/72.8 |
| 5,443,141 | 8/1995 | Thiel et al. ............... 188/71.9 |
| 5,788,023 | 8/1998 | Schöner et al. ........... 188/158 |
| 5,829,557 | 11/1998 | Halasy-Wimmer et al. ... 188/162 |

FOREIGN PATENT DOCUMENTS

| 0403635B1 | 8/1992 | European Pat. Off. . |
| 2954162C2 | 6/1987 | Germany . |
| 4229042A1 | 3/1993 | Germany . |
| 6249/72 | 4/1973 | United Kingdom . |
| 25297/72 | 8/1973 | United Kingdom . |
| 26242/72 | 8/1973 | United Kingdom . |
| 2117 464 | 10/1983 | United Kingdom . |

Primary Examiner—Douglas C. Butler
Attorney, Agent, or Firm—Herbert L. Lerner; Laurence A. Greenberg

[57] ABSTRACT

The brake system for a motor vehicle has an electromechanical wheel brake actuator mounted on each brake caliper of each wheel. The actuator is controlled by the brake pedal through electric lines and it has a brake piston disposed in a cylindrical bore formed therein. A spindle drive moves the brake piston axially and presses to piston against the brake lining, which effects the braking action on the respective wheel. A piston sealing ring limits the axial movement of the brake piston within the cylindrical bore. A transformer part connects to the brake piston via a non-self-locking pair of threads. A main spring in the brake actuator compensates for brake lining wear. The main spring, upon a return stroke of the spindle drive into a position of repose, moves the transformer part axially out of the brake piston while the brake piston is firmly held by the piston sealing ring.

5 Claims, 4 Drawing Sheets

BRAKE SYSTEM FOR A MOTOR VEHICLE

BACKGROUND OF THE INVENTION

1. Field of the Invention

The invention relates to a brake systems for motor vehicles. More specifically, the invention relates to a brakes system with an actuating device, which is controlled by a brake pedal through electric lines. The actuating device is in the form of an electromechanical wheel brake actuator mounted on the brake caliper of each wheel.

2. Description of the Related Art

Increasing demands now made of motor vehicles in terms of a modern brake system—such as ABS, driving stability controls, drive-slip or traction controls—make wheel-selective brake interventions necessary. This has been accomplished in the prior art with conventional brake systems that have been supplemented with hydraulic pumps and magnet valves (German Patent DE-C 29 54 162). Then, however, vibration problems in the hydraulic lines and difficult triggering of the pressure modulation units, in other words magnet valves, arise. Because of the properties of the magnet valves, which are highly nonlinear two-position members, the control quality with respect to the brake pressure is also limited. Such brake systems also require considerable effort and expense to install in the motor vehicle: brake lines have to be laid and connected, the brake system has to be filled with brake fluid and bled, and the tightness of the system has to be checked. During operation as well, considerable maintenance expense arises, particularly for regularly replenishing the brake fluid and disposing of it in an environmentally appropriate way.

Currently, all known manufacturers still equip their vehicles with conventional brake systems. Wheel-selective brake interventions are effected by means of hydraulic pumps and solenoid valves, at the cost of the above-addressed disadvantages. For gentle brake pressure buildup—for instance in cruise control and tailgating control systems—some manufacturers use electronically regulated negative pressure brake boosters. To suppress the vibration problems and the attendant noise production, proportional valves and pressure reservoirs can be used, but the proportional valves in particular increase the price for the brake system. Nor does this eliminate the disadvantages associated with the hydraulic fluid.

One known brake actuating system for a motor vehicle (German patent disclosure DE 42 29 042 A1) has one electromechanical wheel brake actuator mounted on the brake caliper of each wheel and containing a spindle, driven in the direction of the axle, and an electric motor. The rotor of the electric motor is embodied as a spindle nut of a spindle gear that converts the rotary motion of the rotor into a linear motion of the spindle. The axial force of the spindle is multiplied by a hydraulic step-up gear and transmitted to a piston of a wheel brake cylinder. Readjustment, which is necessary to compensate for wear to the brake linings, is accomplished in this brake actuating system by means of brake fluid flowing from a supply container into the wheel brake cylinder.

Upon electromechanical actuation of the brakes, since there is no hydraulic fluid available, some other readjustment option must be provided for. In a mechanical configuration for automatic compensation of brake lining wear for a mechanically actuated parking brake (European patent disclosure EP 0 403 635 B1), the readjustment is accomplished with the aid of the hydraulic forces that are generated, upon actuation of a disk brake, via a brake pedal, a braking unit, and a master cylinder. The readjustment is effected when the brake is loaded, which requires an intermediate piston.

SUMMARY OF THE INVENTION

It is accordingly an object of the invention to provide a brake system for a motor vehicle which overcomes the above-mentioned disadvantages of the heretofore-known devices and methods of this general type and which compensates for wear to the brake linings without requiring brake fluid for the purpose.

With the foregoing and other objects in view there is provided, in accordance with the invention, an claim 1. brake system for a motor vehicle with a plurality of wheels, a brake pedal, and a brake caliper mounted at each wheel, which comprises:

an actuating device controlled by a brake pedal through electric lines, the actuating device being an electromechanical wheel brake actuator mounted on each brake caliper of each wheel of the motor vehicle;

a brake piston disposed in a cylindrical bore formed in the brake actuator, a spindle drive axially moving the brake piston in the cylindrical bore between a position of repose and a position in which the brake piston is pressed against a brake lining, and a piston sealing ring limiting an axial movement of the brake piston within the cylindrical bore;

a transformer part connected to the brake piston via a non-self-locking pair of threads; and a main spring compensating for brake lining wear disposed in the actuating device, the main spring, upon a return stroke of the spindle drive into the position of repose, moving the transformer part axially out of the brake piston while the brake piston is firmly held by the piston sealing ring.

In accordance with an added feature of the invention, the spindle drive includes a spindle, an electric motor, and a roller screw drive through which the electric motor drives the spindle in an axial direction, a pressure plate disposed between the spindle and the brake piston, and a lever mechanism for boosting and transmitting an axial force of the spindle onto the pressure plate for actuating the brake piston.

In accordance with an additional feature of the invention, the wheel brake actuator includes a pressure plate, a pinion and a toothed segment connected to the pressure plate, and an electric motor rotating the pressure plate through the pinion and the toothed segment, and roller bearings running in ramplike indentations for converting a rotation of the of the pressure plate into an axial movement by which the brake piston is actuated.

In accordance with another feature of the invention, the piston sealing ring is formed such that it undergoes an elastic deformation only upon a movement of the brake piston in a direction of brake actuation, while it firmly holds the brake piston upon a movement in an opposite direction.

In accordance with a concomitant feature of the invention, there is provided a pressure plate acting on the transformer part and a secondary spring biasing the pressure plate apart from the transformer part.

The advantages of the invention are in particular that the brake actuation can be readjusted with the brake in its non-engaged rest position. This does not require an intermediate piston, nor any hydraulic forces. The complete wheel brakes for each wheel of the motor vehicle can be manufactured and shipped as finished parts. For installation in the motor vehicle, only little effort and expense are necessary, and the maintenance expense is also low. Electrical supply and control lines need merely be connected to the brake actuator, which is delivered as a structural unit, on the wheel brake caliper. Moreover, such a brake system allows continuous regulation of the brake force at each wheel of the vehicle. From the basic braking function through ABS systems to driving stability controllers and electronically regulated brake reinforcement in emergency braking, all the demands made of a modern brake system can be realized without additional expense for circuitry or components. By the elimination of the hydraulic fluid, the maintenance expense is reduced, and the brake system is further improved with regard to its environmental compatibility.

Other features which are considered as characteristic for the invention are set forth in the appended claims.

Although the invention is illustrated and described herein as embodied in a brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
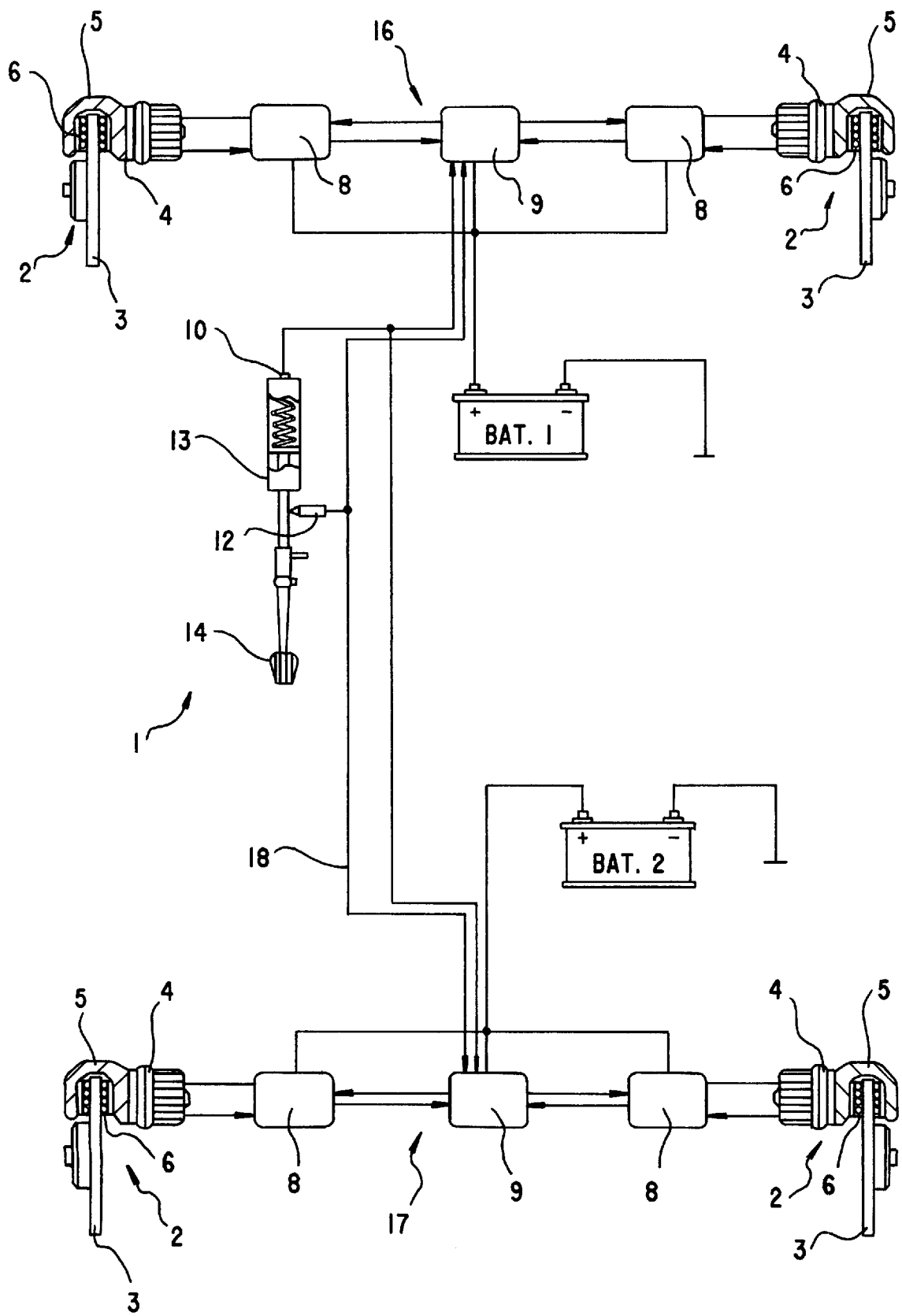
FIG. 1 is a schematic view of a brake system according to the invention.

Referring now to the figures of the drawing in detail and first, particularly, to FIG. 1 thereof, there is seen a brake system 1 for a motor vehicle with four wheels. For clarity of the illustration, the motor vehicle is not shown in detail. The system in question includes four brakes 2, each of which includes one brake disk and one actuating device in the form of a wheel brake actuator 4—hereinafter also called an actuator. Each wheel brake actuator 4 is integrated into one associated brake caliper 5 or, in other words, combined therewith to form a structural unit. The brake caliper 5 is a floating caliper. A braking torque is exerted on the brake disk 3 via brake linings 6 upon each actuation of the wheel brake actuator 4.

Each wheel brake actuator 4 has an electronic power and control system 8, which is supplied by an associated control unit 9 with control signals, for instance for the desired torque of a wheel brake actuator motor, to be described hereinafter, and transmits feedback variables, for instance about the actual torque of the actuator motor, to the control unit 9.

The electronic power and control system 8 also receives feedback variables from the wheel brake actuator 4, for example about the engine speed (rpm) or the rotational angle of the engine or about the contact pressure of the brake linings. The desired variables for each wheel brake actuator are ascertained by the control unit 9 from measured variables that are furnished by various sensors, for instance a force sensor 10 and a travel sensor 12, with which a pedal force simulator 13 is provided, the simulator 13 being actuated by the brake pedal 14 of the motor vehicle. The pedal force simulator 13 converts the motion of the brake pedal 14, i.e., the force exerted by the driver in the usual way and the pedal force, into electrical signals which are supplied to the control unit 9 and which represent desired values for the brakes 2, in particular for the vehicle deceleration and for the force or braking torque to be brought to bear on the brake disks. To calculate the desired values upon an intervention of ABS or driving stability controls, the control unit 9 evaluates further sensor signals, for example the transverse acceleration or yaw angle speed and the wheel rpm.

The brake system 1 of FIG. 1 has two brake circuits 16 and 17, which are assigned to the front and rear axles, respectively. An equally possible diagonal brake circuit allocation differs from this only in a different allocation of the wheel brake units to the control units and energy supply systems. Each brake circuit 16, 17 has its own control unit 9 and its own energy supply system, in the form of a battery BAT.1 and BAT.2, respectively. The energy supply systems and the control units may each be accommodated in the same housing but must then be functionally separate from one another.

Supply lines are shown in heavy lines in FIG. 1 and are not provided with arrows; control lines are shown in fine lines and are provided with arrows indicating the signal flow direction.

The two control units 9, functioning independently of one another, may communicate with one another over a bidirectional signal line, so that the failure of one brake circuit 16 or 17 can be detected in the other brake circuit and these control units can initiate suitable emergency provisions as needed. The brake system may also be expanded by a non-illustrated third control unit which monitors the two brake circuit control units as a supervisor.

Figure 2:
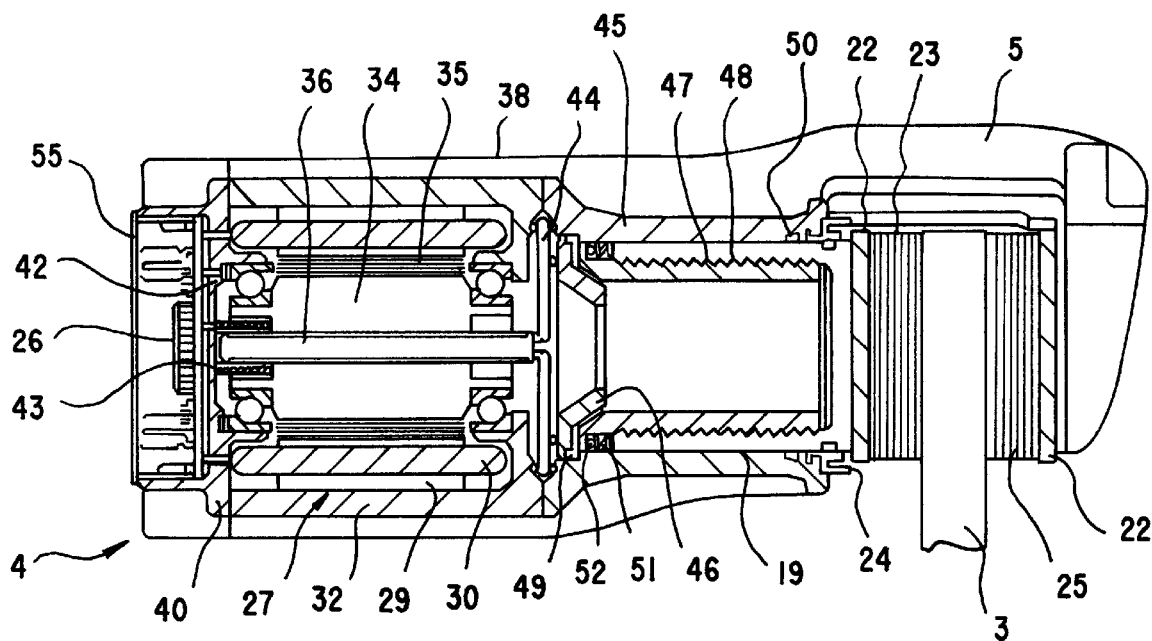
FIG. 2 is a sectional view of an electromechanical wheel brake actuator for a brake system according to the invention, the actuator being integrated with a floatingly mounted brake caliper for a disk brake of a motor vehicle.

Referring now to FIG. 2, the wheel brake actuator 4 is mounted directly on the brake caliper 5. The brake caliper is formed with a cylindrical bore 19, in which a displaceable brake piston 48 is guided. The brake piston 48 presses against a plateshaped brake lining carrier 23 of the inner brake lining 12. Due to the floating support of the brake caliper, the same force is exerted on an outer brake lining 25 as well. As a result, the brake linings are pressed against the brake disk, and because of the friction between the brake linings 23 and 25 and the brake disk 11 they generate a braking torque, which is transmitted to the motor vehicle and leads to its being braked. The mode of operation of floating caliper brakes for motor vehicles is well known in detail and therefore need not be explained further here. The cylindrical bore 19 is protected against the intrusion of dirt, moisture, and abraded brake lining material by a dust protection seal 24.

The force on the inner brake lining is brought to bear as follows.

An electric motor 27 is driven by an electronic control and power system 26. In the exemplary embodiment, the motor 27 is an electronically commutated DC motor. The stator of the motor comprises a stator part 29, into whose slots windings 30 are inserted. The stator part 29 is permanently connected to a motor housing 32. The rotor of the electric motor comprises a spindle nut 34 of a roller screw drive, on which the rotor magnets 35 are mounted. The roller screw drive converts the rotary motion of the spindle nut 34 into a longitudinal motion of the spindle 36. The motor torque is correspondingly converted into an axial force of the spindle 36. The construction and mode of operation of roller screw drives are known (see for instance RGT, published by INA Lineartechnik oHG, Germany), so that further details in this respect can be dispensed with.

For both radial guidance and absorption of the axial forces, the spindle nut 34 is supported on bearings 38, in the exemplary embodiment on two angular-contact ball bearings. The axial force of the spindle 36 is transmitted in the roller screw drive to the spindle nut 34 and is introduced via a rear bearing 38 into a housing bottom 40 that is permanently connected to the motor housing 32. Located between the housing bottom 40 and the outer race of the rear bearings 38 is an annular force sensor 42, embodied in the exemplary embodiment as a piezoelectric sensor, whose signal is evaluated by the electronic control and power system 26. The absolute travel of the spindle 36 in the axial direction is detected by a travel sensor 43, which in the exemplary embodiment is embodied as an inductive sensor. Its signal, as well, is used by the electronic control and power system 26.

The axial force of the spindle 36 is transmitted to a pressure plate 46, having been stepped up—and boosted multiple times—via a lever mechanism 44. This mechanical step-up reduces the force to be brought to bear by the spindle 36 considerably, thus also lessening the demands made of the torque of the electric motor 37 and reducing the frictional forces in the bearings 38.

The pressure plate 46 has an inner conically extending edge. It is supported in a torsionally fixed manner in a housing 45 of the brake caliper 5, hereinafter also called the caliper housing, with which the motor housing 32 is permanently connected, and it moves longitudinally toward a transformer part 47 under the influence of the force exerted on it by the lever mechanism 44, and in the process a secondary spring 49 is compressed. If the pressure plate 46 rests with its conical portion on an inner cone of the transformer part 47, the result is a nonpositive connection between these two parts. As a result of the friction between the two cone-shaped parts, a rotary motion of the transformer part 47 is prevented, since as noted the pressure plate 46 is displaceable only in the axial direction.

The transformer part 47 and a brake piston 48 are provided with a paired steep-pitch thread that is not self-locking. The brake piston 48 is secured in a torsionally fixed manner on the inner brake lining carrier 22 by a suitable securing means on its face end (for instance by indentations engaged by protrusions of the brake lining carrier). Consequently it can move only in the longitudinal or axial direction. Since the brake piston 48 and the transformer part 47 are now both secured against rotation, the force of the pressure plate 46 is transmitted via the paired steep-pitch threads to the brake piston 48 and thus to the brake lining 23.

A piston sealing ring 50 is elastically deformable and adheres to the brake piston 48 as long as the travel of the piston longitudinally does not exceed a predetermined amount—such as 1 mm. When the brake linings are in contact, the deformation travel of the piston sealing ring or sealing ring 50 is dimensioned such that the normal widening of the brake caliper 5 and the compression of the brake linings 23 and 25 do not exceed the limit of adhesion between the piston sealing ring 50 and the brake piston 48. However, if lining wear causes a longer travel of the brake piston 48, then the piston sealing ring 50, after exceeding the deformation limit, slides for some distance along the brake piston 48 and thus compensates for the lining wear. To prevent the spindle 36, on returning to its position of repose that is independent of lining wear, from retracting the brake piston 48 fully again, the paired steep-pitch threads between the transformer part 47 and the brake piston 48 are embodied as non- self-locking.

If when the brake is relieved after a brake actuation a readjustment is made to compensate for the lining wear, then the brake piston 48 moves longitudinally back again far enough that the piston sealing ring 50 has reached its position of repose. The groove of the piston sealing ring 50 is embodied such that an elastic deformation is possible only upon a motion of the brake piston 48 for accessing the brake, but not upon a return stroke of the brake piston 48 past the position of repose of the piston sealing ring 50. The piston sealing ring 50 now firmly holds the brake piston 48, while the spindle 36 and the lever mechanism 44 connected to it move farther backward to their wear-free position of repose. In this process, the secondary spring 49 lifts the pressure plate 46 away from the transformer part 47 and thus also rescinds the torsional securing of the transformer part 47. The brake piston 48 is firmly held by the piston sealing ring 50. A main spring 51, via the axial bearing 52, now presses against the transformer part 47 and sets it into rotation, because of the non-self-locking pairing of steep-pitch threads. Because of this rotary motion, the transformer part 47 moves longitudinally out of the brake piston 48, until via the conical faces it again comes to rest on the pressure plate 46. This compensates for the wear to the brake linings 6, and the brake piston 48 has moved outward from the cylinder bore 19 in the brake caliper housing 46 by a distance corresponding to the amount of wear.

The function of the sealing ring 50 is entirely equivalent to its function in conventional hydraulically actuated disk brakes and is well known from the pertinent literature.

When the brake linings are replaced, the brake piston 48 has to be thrust back into the brake caliper housing 45. This is done with a tool that engages the indentations on the face end of the brake piston 48, and with this tool the brake piston 48 is screwed back into the cylinder bore 16 and screwed onto the transformer part 47.

Figure 3:
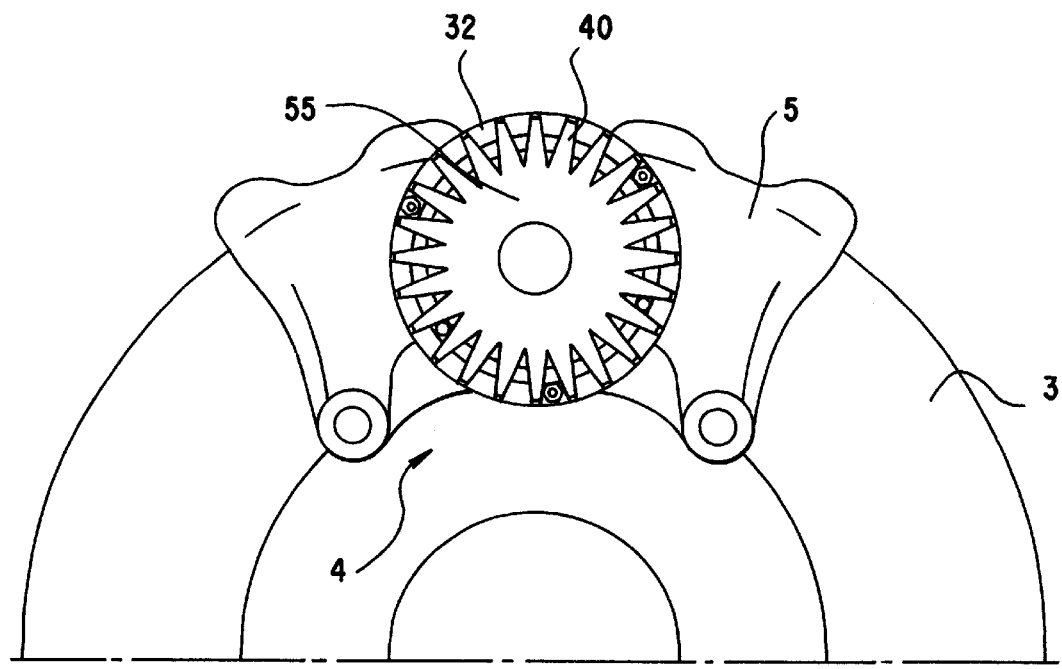
FIG. 3 is a partial side elevational view of the wheel brake actuator of FIG. 2.

FIG. 3 shows the location of the brake caliper 5 and of the wheel brake actuator (or actuating device) 4 with regard to the brake disk 3. The motor housing 32 and the housing body 40 are provided with cooling fins. To protect against moisture and dirt, a cover plate 55 is mounted above the electronic control and power system 26.

Figure 4:
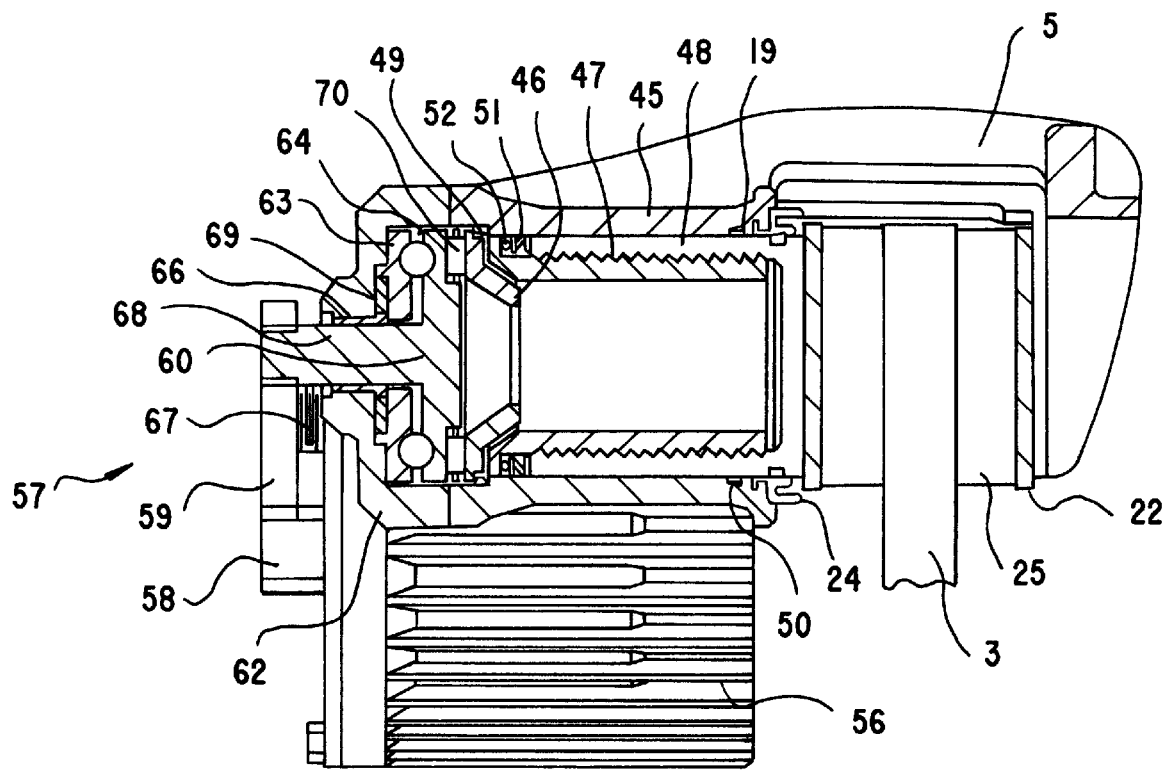
FIG. 4 is a sectional view of another exemplary embodiment of the wheel brake actuator according to the invention.
Figure 5:
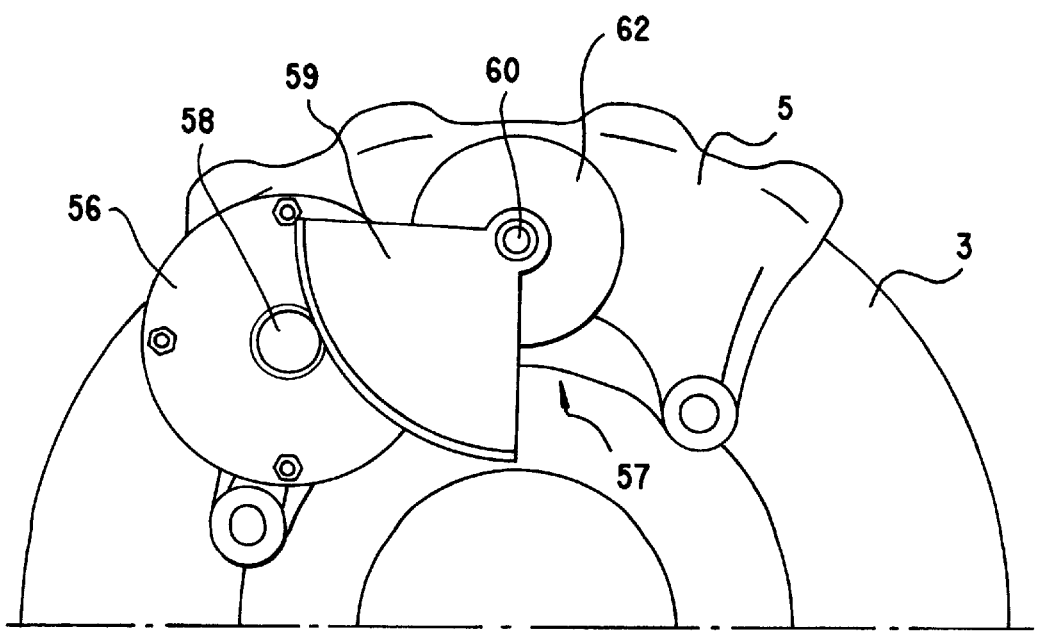
FIG. 5 is a side elevational view of the wheel brake actuator of FIG. 4.

A second exemplary embodiment of a wheel brake actuator 57 according to the invention can be seen in FIG. 4, and the position of this wheel brake actuator 57 and brake caliper 5 relative to the brake disk 3 can be seen in FIG. 3. For the sake of simplicity, a holder was not shown in the drawing.

The function of readjustment of the brakes, or in other words the compensation for brake lining wear, is entirely equivalent to the function of the first exemplary embodiment of the brake system. The pressure plate 46, which here again is torsionally secured but is accommodated axially movably in the housing 45 of the brake caliper 5, is not actuated here via a lever mechanism and a spindle, however, but rather via a mechanism described as follows:

An electric motor 56 with an integrated gear, which will be described in further detail in conjunction with FIG. 6, drives a toothed quadrant 59 via a pinion 58. The toothed quadrant 59 is connected via a toothing to the shaft of an actuating pressure plate 60. Roller bodies or balls are located between the actuating pressure plate 60 and a pressure plate 63 firmly connected to a piston bottom 62. The actuating pressure plate 60 and the pressure plate 63 structurally connected to the housing have ramplike indentations 65, in which the roller bodies 64 run (see FIG. 7). The shaft of the actuating pressure plate 60 is guided in a slide bearing 66 and protected against dirt and moisture by a seal 68. The driven pinion 58, the electric motor 56 and the toothed quadrant 59 are protected against harmful environmental factors by a covering hood, not shown here.

A force sensor 69 is located between the pressure plate 63 connected to the housing and the piston bottom 62 that is firmly connected to the caliper housing 45; a rotary angle sensor 67 in the form of an absolute angle encoder and embodied here as a capacitive sensor is mounted on the shaft of the actuating pressure plate 60. Since such angle encoders are well known, it is not shown here. The signals of the two sensors are evaluated by the electronic control and power system 26 of the electric motor 56 (see FIG. 6).

The rotary motion transmitted by the toothed quadrant 59 from the pinion 58 to the actuating pressure plate 60 generates an axial forward-thrust motion of the actuating pressure plate 60, by means of the roller bodies 64 that move in the ramplike indentations 56. This forward-thrust motion, generated in the manner of a ball and ramp drive, is transmitted via an axial needle bearing 70 to the pressure plate 46, which then, as described in conjunction with FIGS. 2 and 3, moves the brake linings. The pitch of the ramplike indentations 65 in the pressure plate 63 structurally connected to the housing relative to the actuating pressure plate 60 defines the step-up ratio between the torque, acting on the actuating pressure plate 60, and the force acting on the pressure plate 52. Along with the step-up by the toothed segment 59 and that of the gear in the motor 56, this step-up serves to keep the requisite motor torque low and hence to keep the motor size small, which affords a considerable advantage over known brake systems.

Figure 6:
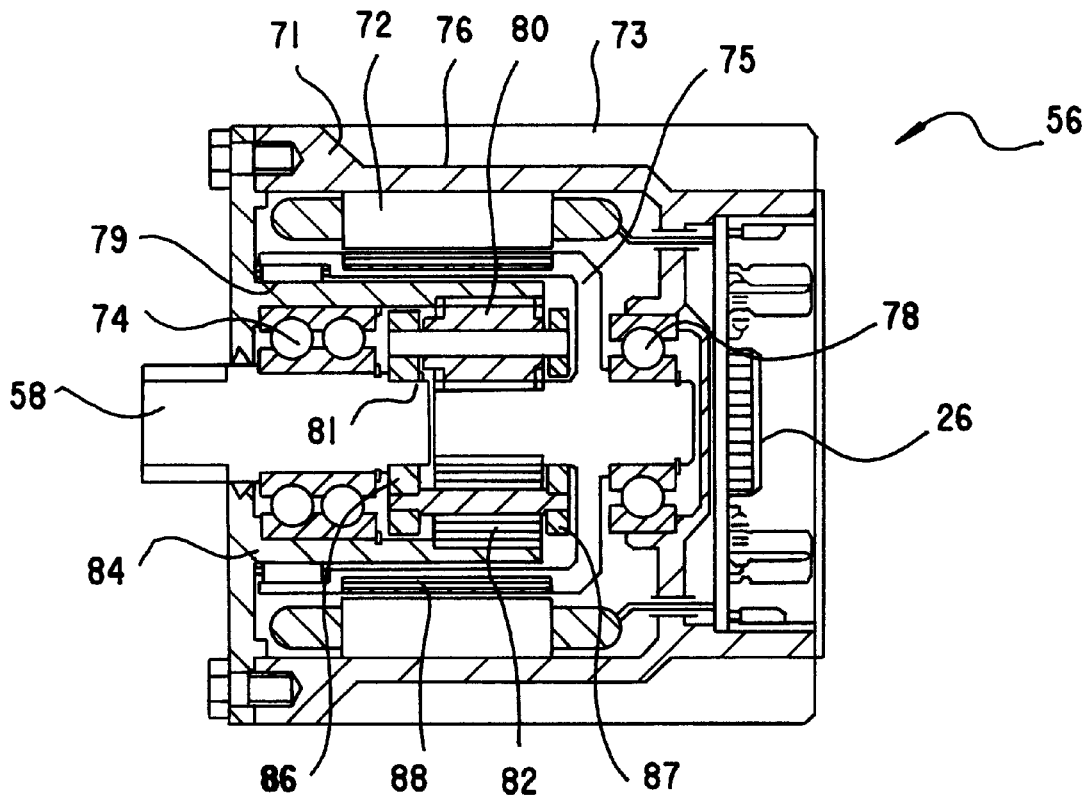
FIG. 6 is a sectional view of a motor-transmission unit with an integrated electronic control and power system as used in the wheel brake actuator of FIG. 4.
Figure 7:
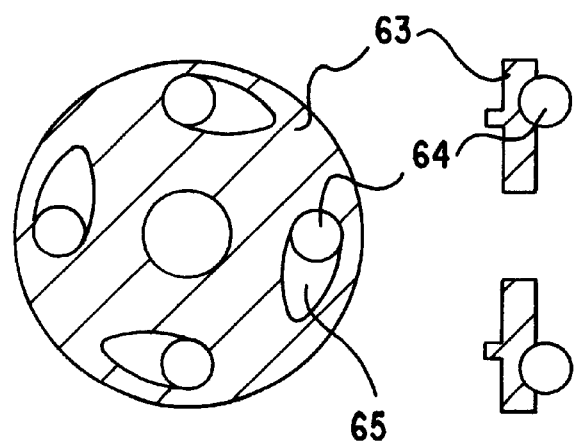
FIG. 7 is an elevational view of a ball-ramp drive used in the wheel brake actuator of FIG. 4.

FIG. 6 shows the construction of the electric motor 56 with an integrated gear (also known as a geared motor) used in the second exemplary embodiment. The electronic control and power system 26 is mounted on the motor 56 and the motor is embodied as an electronically commutated DC motor. The stator of the motor 56 comprises a stator part 72, which is firmly connected to a motor housing 71 provided with cooling fins and whose slots hold a winding 73. The rotor 75 is bell-shaped and carries rotor magnets 76; its shaft is guided in a drive shaft bearing 78, and the bell-shaped part is additionally supported via a rotor bearing 79.

The end of the rotor shaft opposite the rotor bearing 79 is provided with a toothing and forms the sun wheel of a planetary gear, which in the exemplary embodiment is embodied in a single stage but may also be in multistage form. Planetary gears are well known, so a detailed description will be dispensed with. Planet wheels 80, which are loosely supported on guide pins 81, are driven by the rotor shaft and run in an internal toothing 82 of a bottom part 84 firmly connected to the motor housing 71. The planet wheels 80 are guided by a cage, comprising a cage base plate 86, a cage counterplate 87, the guide pins 81 and buttressing pins 88, and they transmit the rotary motion of the rotor 75, at a predetermined step-up ratio, to the shaft of the drive pinion 58, which is firmly connected to the cage base plate 86. The shaft of the pinion 58 is guided by the bearing 74.

This kind of arrangement with a fixed outer ring and a driven sun wheel is the most favorable solution with respect to the step-up ratio, where installation space is constricted.

I claim:

1. A brake system for a motor vehicle with a plurality of wheels, a brake pedal, and a brake caliper mounted at each wheel, which comprises:

an actuating device controlled by a brake pedal through electric lines, said actuating device being an electromechanical wheel brake actuator mounted on each brake caliper of each wheel of the motor vehicle;

a brake piston disposed in a cylindrical bore formed in said brake actuator, a spindle drive axially moving said brake piston in said cylindrical bore between a position of repose and a position in which said brake piston is pressed against a brake lining, and a piston sealing ring limiting an axial movement of said brake piston within said cylindrical bore;

a transformer part connected to said brake piston via a non-self-locking pair of threads; and a main spring compensating for brake lining wear disposed in said actuating device, said main spring, upon a return stroke of said spindle drive into the position of repose, moving said transformer part axially out of said brake piston while said brake piston is firmly held by said piston sealing ring.

2. The brake system according to claim 1, wherein said spindle drive includes a spindle, an electric motor, and a roller screw drive through which said electric motor drives said spindle in an axial direction, a pressure plate disposed between said spindle and said brake piston, and a lever mechanism for boosting and transmitting an axial force of said spindle onto said pressure plate for actuating said brake piston.

3. The brake system according to claim 1, wherein said wheel brake actuator includes a pressure plate, a pinion and a toothed segment connected to said pressure plate, and an electric motor rotating said pressure plate through said pinion and said toothed segment, and roller bearings running in ramplike indentations for converting a rotation of said of said pressure plate into an axial movement by which said brake piston is actuated.

4. The brake system according to claim 1, wherein said piston sealing ring is formed such that it undergoes an elastic deformation only upon a movement of said brake piston in a direction of brake actuation, while it firmly holds said brake piston upon a movement in an opposite direction.

5. The brake system according to claim 1, which further comprises a pressure plate acting on said transformer part and a secondary spring biasing said pressure plate apart from said transformer part.

* * * * *